(12) United States Patent
Chida et al.

(10) Patent No.: US 8,710,142 B2
(45) Date of Patent: Apr. 29, 2014

(54) LOW-STAINING ROOM TEMPERATURE CURABLE COATING COMPOSITION

(75) Inventors: Akira Chida, Settsu (JP); Shinya Murakami, Settsu (JP); Susumu Wada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 228 days.

(21) Appl. No.: 13/258,435

(22) PCT Filed: Mar. 18, 2010

(86) PCT No.: PCT/JP2010/054656
§ 371 (c)(1),
(2), (4) Date: Sep. 21, 2011

(87) PCT Pub. No.: WO2010/110166
PCT Pub. Date: Sep. 30, 2010

(65) Prior Publication Data
US 2012/0029140 A1 Feb. 2, 2012

(30) Foreign Application Priority Data
Mar. 25, 2009 (JP) .................. 2009-074402

(51) Int. Cl.
*C08L 27/12* (2006.01)
(52) U.S. Cl.
USPC .......................... 524/546; 524/544

(58) Field of Classification Search
USPC ........................................... 524/161
See application file for complete search history.

(56) References Cited

U.S. PATENT DOCUMENTS 6,271,293 B1  8/2001  Karuga et al.
7,834,126 B2 * 11/2010  Haubennestel et al. ...... 528/271

FOREIGN PATENT DOCUMENTS

| JP | 8-231919 A | 9/1996 |
| JP | 8-337755 A | 12/1996 |
| JP | 08337755 A * | 12/1996 ........... C09D 183/06 |
| JP | 10-152646 A | 6/1998 |
| JP | 10-324845 A | 12/1998 |
| JP | 2001-106978 A | 4/2001 |
| JP | 2007-107002 A | 4/2007 |

OTHER PUBLICATIONS

Translation of JP 08-337755, Dec. 24, 1996.*

* cited by examiner

*Primary Examiner* — Hui Chin
(74) *Attorney, Agent, or Firm* — Sughrue Mion, PLLC

(57) ABSTRACT

The present invention provides a low-staining room temperature curable coating composition having an excellent low-staining property and recoatability, and comprising (A) a hydroxyl-containing resin, (B) an isocyanate based curing agent, (C) an organosilicate based hydrophilizing agent, (D) a recoatability modifier and (E) an organic solvent, in which the recoatability modifier (D) comprises at least (D1) an amide-containing polymer and (D2) a silane coupling agent.

7 Claims, No Drawings

LOW-STAINING ROOM TEMPERATURE CURABLE COATING COMPOSITION

CROSS REFERENCE TO RELATED APPLICATIONS

This application is a National Stage of International Application No. PCT/JP2010/054656 filed Mar. 18, 2010, claiming priority based on Japanese Patent Application No. 2009-074402 filed Mar. 25, 2009, the contents of all of which are incorporated herein by reference in their entirety.

TECHNICAL FIELD

The present invention relates to a low-staining room temperature curable coating composition having both of excellent low-staining property and recoatability (lap coating or overcoating property).

BACKGROUND ART

Room temperature curable coating compositions are widely used as coating materials for on-site application in which cure treatment by heating or the like is difficult, for example, for coating of roofs and walls of outdoor constructions.

Fluororesins, acrylic polyol resins and other hydroxyl-containing resins, which have water repellency, are used as film forming components for these coating materials, and furthermore, hydrophilizing agents such as hydrolysable silicates are sometimes added to enhance a stain proofing property.

However, in the case where hydrolysable silicates are compounded as a hydrophilizing agent, stain proofing property improves, but recoatability is insufficient. For example, exterior walls of constructions are normally coated over a few days. However, when overcoating on the coating film applied on the previous day, the overcoated film is sometimes peeled off. This phenomenon arises particularly significantly in the case where a fluororesin is used as a film forming component and fluoro silicate is used as a hydrophilizing agent. Therefore, the improvement has been desired for solving the problem.

In Patent Document 1, for example, a method for improving recoatability, in which an amine catalyst is used as a curing catalyst to promote the hydrolysis of a hydrophilizing agent and furthermore a silane coupling agent having an isocyanate group at one end thereof is used in combination, is proposed.

In Patent Document 2, the use of a chlorine-substituted alkyl silicate as a hydrophilizing agent is proposed.

Additionally, Patent Document 3 proposes an aqueous coating composition, in which recoatability is improved by compounding an amino-containing silane coupling agent.

PRIOR ART DOCUMENTS

Patent Documents

Patent Document 1: JP-A-08-231919
Patent Document 2: JP-A-10-324845
Patent Document 3: JP-A-2001-106978

DISCLOSURE OF INVENTION

Problem to be Solved by the Invention

In the method of Patent Document 1, since the speed of hydrophilization with an amine catalyst is too fast, a problem of sustainability of a stain proofing effect occurs and a problem of workability of coating due to a shorter pot life remains unsolved. In addition, an effect of improving recoatability by compounding a silane coupling agent having an isocyanate group at one end thereof is not sufficient.

In the case where chlorine-substituted alkyl silicate is used as a hydrophilizing agent, which is proposed in Patent Document 2, it is difficult to obtain a surface migration and concentration property and a low-staining property of a coating film which are equal to those of fluorosilicate.

Further, in the method for compounding an amino-containing silane coupling agent of Patent Document 3, similarly to Patent Document 1, sustainability of a stain proofing effect is lowered, workability of coating is poor due to a shorter pot life, and an effect of improving recoatability is not sufficient.

An object of the present invention is to provide a low-staining room temperature curable coating composition having both of excellent low-staining property and recoatability.

Means to Solve the Problem

Namely, the present invention relates to a low-staining room temperature curable coating composition comprising (A) a hydroxyl-containing resin, (B) an isocyanate based curing agent, (C) an organosilicate based hydrophilizing agent, (D) a recoatability modifier and (E) an organic solvent, wherein the recoatability modifier (D) comprises at least (D1) an amide-containing polymer and (D2) a silane coupling agent.

The hydroxyl-containing resin (A) is preferably a hydroxyl-containing fluororesin (A1), because of excellent weather resistance, chemical resistance, solvent resistance and heat resistance of a cured film obtained by crosslinking and also because of the resin being easily obtainable.

The organosilicate based hydrophilizing agent (C) is preferably a fluorine-containing or non-fluorine-containing silicon compound having a hydrolysable group or an oligomer thereof.

The recoatability modifier (D1) is preferably an amide-containing polymer and the recoatability modifier (D2) is preferably a silane coupling agent having an NCO group at one end thereof.

The mixing ratio of each component is preferably 0.1 to 100 parts by mass of the isocyanate based curing agent (B), 0.1 to 25 parts by mass of the organosilicate based hydrophilizing agent (C), 0.1 to 25 parts by mass of the recoatability modifier (D1) and 0.1 to 25 parts by mass of the recoatability modifier (D2) based on 100 parts by mass of the hydroxyl-containing resin (A).

The present invention also relates to a method for producing the above-mentioned low-staining coating composition in which a first resin composition comprising the hydroxyl-containing resin (A), the recoatability modifier (D1) and the organic solvent (E) and a second curing agent composition comprising the isocyanate based curing agent (B), the organosilicate based hydrophilizing agent (C), the recoatability modifier (D2) and the organic solvent (E) are mixed, to a resin composition comprising the hydroxyl-containing resin (A), the recoatability modifier (D1) and the organic solvent (E), and to a curing agent composition comprising the isocyanate based curing agent (B), the organosilicate based hydrophilizing agent (C), the recoatability modifier (D2) and the organic solvent (E).

Effect of the Invention

The present invention can provide a low-staining room temperature curable coating composition having both of excellent low-staining property and recoatability.

EMBODIMENT FOR CARRYING OUT THE INVENTION

The low-staining room temperature curable coating composition of the present invention comprises (A) the hydroxyl-containing resin, (B) the isocyanate based curing agent, (C) the organosilicate based hydrophilizing agent, (D) two or more specific recoatability modifiers and (E) the organic solvent.

Each component will be explained below.

(A) Hydroxyl-Containing Resin

Resins which are film forming components and are used in known room temperature curable coating materials such as hydroxyl-containing fluororesin (A1), acrylic polyol resin (A2) and other hydroxyl-containing resin (A3) can be used.

(A1) Hydroxyl-Containing Fluororesin

Known resins can be used as a hydroxyl-containing fluororesin, and examples thereof include hydroxyl-containing fluororesins described in WO 94/06870, JP-A-8-12921, JP-A-10-72569, JP-A-4-275379, WO 97/11130 and WO 96/26254.

Particular and non-limiting examples include, for example, fluoroolefin based fluororesins which can be obtained by copolymerizing fluoroolefin, a hydroxyl-containing radically polymerizable unsaturated monomer, and if necessary, other radically polymerizable unsaturated monomer being copolymerizable therewith; fluorine-containing acrylic resins which can be obtained by copolymerizing a monomer which has a perfluoroalkyl group or a perfluoroalkenyl group at one end thereof and an ethylenic double bond at the other end, a hydroxyl-containing acrylate, and if necessary, other radically polymerizable unsaturated monomer being copolymerizable therewith; and the like.

Examples of fluoroolefins include, for example, one or more of tetrafluoroethylene (TFE), chlorotrifluoroethylene (CTFE), trifluoroethylene (TrFE), vinylidene fluoride (VdF) and hexafluoropropylene (HFP), and especially, TFE, CTFE and VdF are preferable in view of excellent solvent solubility of fluoroolefin based fluororesins obtained therefrom and excellent weather resistance, heat resistance and chemical resistance of the obtained coating films.

Examples of hydroxyl-containing radically polymerizable unsaturated monomers include those having hydroxyl groups and a radically polymerizable unsaturated double bond being radically copolymerizable with fluoroolefin. Preferable examples include, for example, hydroxyalkyl vinyl ethers such as hydroxyethyl vinyl ether, hydroxypropyl vinyl ether, hydroxybutyl vinyl ether and hydroxypentyl vinyl ether; hydroxyallyl ethers such as ethylene glycol monoallyl ether, diethylene glycol monoallyl ether, triethylene glycol monoallyl ether and glycerin monoallyl ether; and furthermore, adducts of these hydroxyl-containing radically polymerizable unsaturated monomers and lactones such as ε-caprolactone and γ-valerolactone.

Other copolymerizable radically polymerizable unsaturated monomer can be selectively used from well-known monomers depending on desired performances of coating films. Particularly, examples thereof include α-olefins such as ethylene, propylene, isobutylene, butylene-1 and chloroprene; vinyl ethers such as ethyl vinyl ether, isobutyl vinyl ether, butyl vinyl ether, cyclohexyl vinyl ether, propyl vinyl ether, isopropyl vinyl ether, tert-butyl vinyl ether, pentyl vinyl ether and hexyl vinyl ether; allyl vinyl ethers such as phenyl vinyl ether, o-, m-, p-trivinyl ether; carboxylic acid vinyl esters such as vinyl acetate, vinyl lactate, vinyl butyrate, vinyl isobutyrate, vinyl caproate, vinyl isocaproate, vinyl pivalate, vinyl versatate (e.g. $CH_2=CHOC=OC_8H_{17}$, $CH_2=CHOC=OC_9H_{19}$) and vinyl benzoate; isopropenyl esters of aliphatic acids such as isopropenyl acetate and isopropenyl propionate.

The hydroxyl-containing fluororesin may further include a carboxyl group. The carboxyl group can be introduced, for example, by addition reaction of a part of hydroxyl groups in the hydroxyl-containing fluororesin and polybasic anhydrides (e.g. itaconic anhydride, succinic anhydride).

In the fluorine-containing acrylic resin, preferable examples of the monomers having a perfluoroalkyl group or a perfluoroalkenyl group at one end and an ethylenic double bond at the other end include perfluorobutyl ethyl methacrylate, perfluorooctylethyl methacrylate, perfluoroisononyl ethyl methacrylate and perfluorodecyl ethyl methacrylate.

Preferable examples of hydroxyl-containing acrylate include 2-hydroxyethyl acrylate, hydroxypropyl acrylate, 2-hydroxyethyl methacrylate and hydroxypropyl methacrylate.

Preferable examples of other radically polymerizable unsaturated monomers being copolymerizable with the above-mentioned monomers in the fluorine-containing acrylic resin include esters of alkyl (meth)acrylates such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate and lauryl methacrylate; ethylenically unsaturated carboxylic acids such as acrylic acid and methacrylic acid; aromatic vinyl monomers such as styrene, α-methyl styrene and vinyltoluene; amide compounds of (meth)acrylate and derivatives thereof; and acrylonitriles such as acrylonitrile and methacrylonitrile.

The number average molecular weight of these hydroxyl-containing fluororesins is within a range from about 2,000 to about 100,000, preferably from about 5,000 to about 80,000, since these hydroxyl-containing fluororesins can retain its durability and staining resistance of a coating film, have good compatibility with the curing agent, the hydrophilizing agent and in addition, a hydrophilization accelerating catalyst, and enables good storage stability of coating materials to be maintained.

It is preferable that the hydroxyl value is within a range from about 20 to about 200 mgKOH/g, preferably from about 50 to about 150 mgKOH/g. When the hydroxyl value is too low or too high, in some cases, the durability and staining resistance of the coating film are reduced, the curability is lowered, the hardness is decreased, the mechanical strength is insufficient and the chemical resistance and water resistance are reduced.

Examples of commercially available hydroxyl-containing fluororesins include LUMIFLON (ASAHI GLASS CO., LTD., trade name, hereinafter the same), CEFRAL COAT (CENTRAL GLASS CO., LTD.), ZAFLON (TOAGOSEI CO., LTD.), ZEFFLE (DAIKIN INDUSTRIES, LTD.) and FLUONATE (DIC CORPORATION).

(A2) Acrylic Polyol Resins

Examples of acrylic polyol resins include, for example, polymers of a hydroxyl-containing ethylenically unsaturated monomer such as hydroxyl-containing (meth)acrylic acid ester, hydroxyl vinyl ether or an allyl alcohol, with an olefin having no hydroxyl group or an unsaturated monomer having no hydroxyl group such as vinyl ether, allyl ether, vinyl ester, propenyl ester, (meth)acrylic acid ester, an aromatic vinyl compound, (meth)acrylonitrile, a carboxyl-containing unsaturated monomer, an epoxy-containing unsaturated monomer or an amino-containing unsaturated monomer.

In this way, the acrylic polyol resins may have a carboxyl group, an epoxy group or an amino group in addition to a hydroxyl group.

The hydroxyl value of the acrylic polyol resin is from 1 to 200 (mgKOH/g), preferably from 1 to 100 (mgKOH/g). When the hydroxyl value is lower, the curability of the resin tends to be poor. When the hydroxyl value is higher than 200 (mgKOH/g), a problem of the flexibility of coating films tends to arise.

The acid value of the acrylic polyol resin is from 0 to 200 (mgKOH/g), more preferably from 0 to 100 (mgKOH/g). When the acid value is lower, the curability of the resin tends to be poor. When the acid value is higher than 200 (mg KOH/g), a problem of the flexibility of coating films tends to arise.

Examples of the usable acrylic polyol resins include commercially available products such as DIANAL available from MITSUBISHI RAYON CO., LTD., ACRYNAL available from TOEIKASEI CO., LTD., ACRYDIC available from DIC CORPORATION, HITAROID available from HITACHI CHEMICAL CO., LTD., and OLESTER available from MITSUI CHEMICALS, INC.

(A3) Other Hydroxyl-Containing Resins

Examples of other hydroxyl-containing resins include non-fluorine-containing curable resins such as hydroxyl-containing acrylic resins (including a silicone-modified acrylic resin), hydroxyl-containing ester resins, hydroxyl-containing urethane resins, hydroxyl-containing alkyd resins and hydroxyl-containing silicone resins.

Silicone-modified acrylic resins may be those which are obtained by polymerizing, for example, an acrylic silicon monomer having at least one silane group and a radically polymerizable unsaturated group in one molecule thereof with a hydroxyl-containing ethylenically unsaturated monomer.

For example, commercially available products such as ZEMRAC available from KANEKA CORPORATION, and KURIYAMER available from SANYO CHEMICAL INDUSTRIES, LTD. can be used as the silicone-modified acrylic resin.

Among the resins mentioned above, the hydroxyl-containing fluororesin (A1) is highly required for improvement of recoatability and thus, the effect of the present invention is exhibited most effectively.

(B) Isocyanate Based Curing Agent

In the present invention, isocyanate based compounds which are used in well-known room temperature curable coating materials can be used as the isocyanate based curing agent.

Particular examples of isocyanate based curing agents include polyvalent isocyanate compounds and block compounds thereof. The composition of the present invention is suitable for lap coating of outdoor constructions as mentioned above and in the case where a coating film need to be formed by forced drying after coating, a block compound may be used depending on applications and purposes. Polyvalent isocyanate compounds are compounds having two or more isocyanate groups and may be compounds composed of modified or multimeric form thereof having two or more isocyanate groups. Examples of polyvalent isocyanate compounds include aliphatic polyvalent isocyanate compounds such as tetramethylene diisocyanate, hexamethylene diisocyanate, hexamethylene triisocyanate and lysine diisocyanate; alicyclic polyvalent isocyanate compounds such as isophorone diisocyanate, dicyclohexylmethane diisocyanate and diisocyanatemethylcyclohexane; non-yellowing aromatic polyvalent isocyanate compounds such as xylylene diisocyanate.

Examples of modified and multimeric forms of polyvalent isocyanate compounds include, for example, a modified urethane, a modified urea, a modified isocyanurate, a modified burette, a modified allophanate and a modified carbodiimide and especially, a modified isocyanurate which is a trimer and a modified urethane which is a reaction product with polyalcohol such as trimethylolpropane are preferable.

In the case where an isocyanate based curing agent having free isocyanate groups is used, the obtained low-staining coating composition can cure at room temperature. Especially, it is advantageous for coating in on-site application. Isocyanate based curing agents having blocked isocyanate groups usually provide thermosetting coating compositions similarly to other curing agents.

The adding amount of isocyanate based curing agent (B) is preferably from 0.1 to 100 parts by mass based on 100 parts by mass of hydroxyl-containing resin (A) in view of retaining the crosslinkability of top coating film and the adhesiveness between an intermediate coating film and a top coating film. Especially, the amount is preferably from 1 to 50 parts by mass, further preferably from 5 to 30 parts by mass from the viewpoint of achieving effects successfully on the crosslinkability, solvent resistance and hardness of a coating film.

(C) Organosilicate Based Hydrophilizing Agent

Known organosilicate based compounds (hydrophilizing agents) which can achieve the hydrophilization of a coating film by a hydrolytic action thereof can be used as the hydrophilizing agents (C) used in the present invention.

Preferable examples include, for example, nonfluoroorganosilicates described in WO 94/06870, JP-A-8-12921, JP-A-2000-160103 and JP-A-11-209690, and fluoroorganosilicates described in WO 96/26254 and WO 97/11130. Fluoroorganosilicates are more preferable in view of surface migration and concentration property, speeds of hydrolysis and condensation when coating as well as low-staining performance obtained finally.

Examples of nonfluoroorganosilicate include tetrafunctional silicates represented by the formula (1):

wherein $R^1$ is the same or different and is non-fluorine-containing hydrocarbon groups having 1 to 10 carbon atoms, or oligomers thereof, bi- or trifunctional silicates represented by the formula (2):

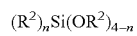

wherein $R^2$ is the same or different and is non-fluorine-containing hydrocarbon groups having 1 to 10 carbon atoms; n is 1 or 2, or oligomers thereof, and furthermore, co-condensates (cooligomers) of tetrafunctional organosilicate and bi- or tri-functional organosilicate.

These nonfluoroorganosilicates or cooligomers thereof (hereinafter simply referred to as organosilicates) may be used alone or in combination of two or more thereof. In view of excellent hydrolyzability (surface hydrophilizing ability), at least tetrafunctional organosilicate is preferably used.

In the formulae (1) and (2), examples of the non-fluorine-containing hydrocarbon groups having 1 to 10 carbon atoms and represented by $R^1$ and $R^2$ (hereinafter simply referred to as "hydrocarbon groups". Hydrocarbon groups containing fluorine are referred to as "fluorine-containing hydrocarbon groups" for classification purpose) include alkyl groups having 1 to 10 carbon atoms and aryl groups having 6 to 10 carbon atoms. In the case where the number of carbon atoms of $R^1$ and $R^2$ exceeds 10, the speed of hydrolysis trends to be lower and time and degree of the surface hydrophilization trend to be insufficient.

Alkyl groups having 1 to 10 carbon atoms may be of linear or branched chain, and examples thereof include methyl, ethyl, n-propyl, iso-propyl, n-butyl, iso-butyl, tert-butyl, n-pentyl, iso-pentyl, neopentyl, n-hexyl, iso-hexyl and n-octyl, and particularly lower alkyl groups having 1 to 3 carbon atoms are suitable in view of good hydrolyzability. Aryl groups having 6 to 10 carbon atoms may be either monocyclic or polycyclic and examples thereof include, for example, substituted or unsubstituted phenyl, toluyl, xylyl and naphthyl.

Preferable example of nonfluoroorganosilicates include, for example, one or more tetrahydroxysilane, tetramethoxysilane, tetraethoxysilane, tetrapropoxysilane, tetrabuthoxysilane, tetraphenoxysilane, dimethoxydiethoxysilane, monomethoxytriethoxysilane and trimethoxymonoethoxysilane; and one or more (co-)condensates thereof. Among them, especially preferable are those as exemplified in JP-A-11-209690, etc. which have hydrolysable leaving groups of different types in the molecule thereof, for example, those having a methoxy group and an alkoxy group having 2 to 10 carbon atoms together and particularly those having a methoxy group and an alkoxy group having 2 to 5 carbon atoms together, since good surface concentration and rapid hydrolysis can be easily achieved. The degree of condensation of condensation product of the organosilicate is preferably from 2 to 100, particularly from 3 to 20. In the case where the degree is too large, the gelation during coating is induced and the pot life trends to be easily lowered.

Examples of fluoroorganosilicate include tetrafunctional fluoroorganosilicates represented by the formula (3):

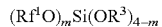

wherein $Rf^1$ is the same or different and is a fluorine-containing hydrocarbon group having 1 to 20 carbon atoms, preferably 1 to 10 carbon atoms which may contain oxygen atom, nitrogen atom and/or silicon atom; $R^3$ is the same or different and is a hydrocarbon group having 1 to 10 carbon atoms, m is a integer of from 1 to 4, or oligomers thereof, bi- or tri-functional fluoroorganosilicates represented by the formula (4):

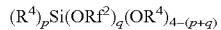

wherein $Rf^2$ is the same or different and is a fluorine-containing hydrocarbon group having 1 to 20 carbon atoms, preferably 1 to 10 carbon atoms which may contain oxygen atom, nitrogen atom and/or silicon atom; $R^4$ is the same or different and is a hydrocarbon group having 1 to 10 carbon atoms; p is 1 or 2; q is 1 to 3; p+q=4, or oligomers thereof, and further co-condensates (cooligomers) of a tetrafunctional fluoroorganosilicate and a bi- or tri-functional fluoroorganosilicate, and if necessary, a bi-, tri- or tetra-functional nonfluoroorganosilicate.

In the formulae (3) and (4), the same groups as $R^1$ and $R^2$ which are described in the formulae (1) and (2) are used as hydrocarbon groups represented by $R^3$ and $R^4$.

Examples thereof include alkyl, fluoroalkyl, fluorocarbonyl and fluoroether groups which are described at pages 7 to 8 in WO 97/11130, and may be of linear or branched chain, and among them, for example, $-(CH_2)_mH$, $-CH(CH_3)_2$, $-CH_2(CF_2)_2H$, $-CH_2(CF_2)_3H$, $-CH_2(CF_2)_4H$, $-CHFCF_2CF_2H$, $-CH_2CF_3$, $-CH_2CF_2CF_3$, $-CH_2(CF_2)_2CF_3$, $-CH_2CF_2CHFCF_3$, $-CH_2CH_2(CF_2)_3CF_3$, $-CH_2CH_2(CF_2)_7CF_3$, $-C=OCF_3$, $-C=OCF_2CF_3$, $-C=O(CF_2)_6CF_3$, and $-C=O(CF_2)_7CF_3$, wherein m is 0 or an integer of from 1 to 6 are particularly preferable in view of good balance of surface concentration property and hydrolyzability.

Preferable examples of fluoroorganosilicates include, for example, one or more fluoroorganosilicates having the above fluorine-containing organic groups described in WO 96/26254 and WO 97/11130; and one or more (co-)condensates thereof.

In the composition of the present invention, well-known hydrophilizing agents having hydrolysable groups other than organosilicates can be optionally used as the above organosilicate based hydrophilizing agent (C). Examples thereof include alkoxide of metals such as Ti, B, Ga, In, Sc, Y, La, Ac, Ge, Sn, Pb, Hf, As, Sb, Bi, V, Nb, Ta, Mo, W, Cr, Mn, Fe, Co, Pd and Pt, other metallic compounds having hydrolysable leaving group and oligomers thereof which are described in WO 97/11130 and JP-A-10-237364. These can be used, according to need, in combination with the organosilicate based hydrophilizing agent (C) or can be optionally used alone without compounding the organosilicate based hydrophilizing agent (C).

Since the organosilicate based hydrophilizing agent (C) is characterized by floating on a coating surface when forming a coating film, even a small amount of the agent can hydrophilize the surface. An adding amount thereof is preferably from 0.1 to 25 parts by mass based on 100 parts by mass of hydroxyl-containing resin (A). In the case where the amount is not less than 25 parts by mass, sometimes recoatability is lowered, a film forming property and an appearance are impaired and embrittlement of a coating film is caused. In the case where the amount is less than 0.1 part by mass, the low-staining property is sometimes reduced. Particularly, the amount is preferably from 0.3 to 20 parts by mass, further preferably from 1 to 10 parts by mass from the viewpoint of achieving an excellent effect on a balance between the securing of coating film performance such as sufficient low-staining property and a film forming property and the material costs.

(D) Recoatability Modifier

According to the present invention, the amide-containing polymer (recoatability modifier D1) is used in combination with the silane coupling agent (recoatability modifier D2) as the recoatability modifier (D). When the recoatability modifier (D1) is used alone, recoatability (the adhesiveness of lap coating or overcoating) is poorer, and also when the recoatability modifier (D2) is used alone, the recoatability is poorer.

(D1) Amide-Containing Polymers

The recoatability modifier (D1) is a polymer and is different from an amine catalyst of Patent Document 1 in a chemical structure, a molecular weight and an influence on a hydrophilizing agent (an amine catalyst easily deteriorates a hydrophilizing agent during formation of a film), and is different from an amino-containing silane coupling agent of Patent Document 3 in a chemical structure, a molecular weight and hydrolysis resistance (an amino-containing silane coupling agent is unstable to water).

According to the present invention, the amide-containing polymer is a polymer having the following primary amide group, secondary amide group or tertiary amide group in at least one of component units.

$$-(Z)-N(X)(Y)$$

wherein Z is a carbonyl group or an organic group having 1 to 50 carbon atoms, preferably 1 to 30 carbon atoms, further preferably 1 to 20 carbon atoms ($-R-CO-$, $-R-SO-$, $-R-CS-$, $-RC(=NH)-$, $-C_6H_5-CO-$, $-R-CO-R-$, $-R-SO-R-$, $-R-CS-R-$, $-RC(=NH)-R-$, $-C_6H_5-C-O-R-$ (R is an alkylene group in which a part of hydrogens may be substituted)).

In the case of a primary amide group, both of X and Y are hydrogens and examples thereof include, for example, $-CONH_2$, $-CO-(CH_2)_n-NH_2$, $-(CH_2)_nCONH_2$, $-C_6H_{10}CONH_2$, $-C_6H_4-SO_2NH_2$, $-CH_2SONH_2$, $-(CH_2)_nSNH_2$, $-COCONH_2$, $-CH_2CSNH_2$, $-(CH_2)_nC(=S)NH_2$, $-C_6H_4-C(=S)NH_2$, $-CH_2C(=NH)NH_2$, and $-C_6H_4C(=NH)NH_2$ (n is an integer of 1 to 40, preferably 1 to 30).

In the case of a secondary amide group, either of X or Y is hydrogen and the other is an organic group having 1 to 30 carbon atoms, preferably 1 to 10 carbon atoms (alkyl group, acyl group ($-CO-R$ or $-SO-R$), thioacyl group ($-CS-R$), amidine group ($-C(=NH)R$), phenyl group, substituted phenyl group or hydroxyl group) and examples thereof include $-CONHC_nH_{2n+1}$, $-(CH_2)_nCONHC_nH_{2n+1}$, $-C_6H_4-CONH-C_6H_5$, $-C_6H_{10}-CONH-C_6H_5$, $-C_6H_4-SO_2NH-C_6H_5$, $-CH_2C(=S)NHC_nH_{2n+1}$, $-(CH_2)N-C(=S)NHC_nH_{2n+1}$, $-C_6H_4-C(=S)NHC_nH_{2n+1}$, $-C_6H_4-C(=S)-NH-C_6H_5$, $-(CH_2)_nCONHOH$, $-C_6H_{10}-CONHOH$, $-CONHCOC_nH_{2n+1}$, and $-CONHCOC_nH_{2n}C(=NH)-$ (n is an integer of 1 to 30, desirably 1 to 10).

A moiety of tertiary amide is one in which both of X and Y may be the same or different and which has similar organic group as one having 1 to 30 carbon atoms, preferably 1 to 10 carbon atoms and exemplified in the secondary amides. Primary, secondary and tertiary amide groups are not limited to those.

Examples of polymers having these amide groups include amide-containing polymers described in JP-A-2007-107002 (e.g. the formula described at page 1 and in paragraphs [0009] to [0053] of the same publication) and carboxylate, phosphate and sulfonate thereof. These are preferable in view of excellent solvent solubility, easy availability, easy handling, material costs and the like.

The number average molecular weight of preferable amide-containing polymers used as the recoatability modifier (D1) in the present invention is from 2,000 to 100,000, preferably from 3,000 to 70,000 and the content of nitrogen is from about 0.5 to about 30% by mass, preferably from 1 to 20% by mass.

One or more recoatability modifiers (D1) may be used. Preferable examples of commercially available products include, for example, BYK4500, BYK430, BYK431 and BYK405 available from BYK Chemie and POLYMENT NK380 and POLYMENT NK350 available from NIPPON SHOKUBAI CO., LTD. Among them, BYK4500 is particularly preferable in view of a higher effect of improving recoatability, easy handling and easy mixing when preparing the coating composition, easy coating and excellent appearance, weather resistance or the like of a finished coating film.

(D2) Silane Coupling Agent

Examples of preferable silane coupling agents include, for example, well-known silane coupling agents having an NCO group, an amino group, an epoxy group, an acryloxy group, a methacryloxy group, a mercapto group and a halogen-containing alkyl group at an end thereof.

Examples of preferable silane coupling agent having an NCO group at its end are compounds represented by the formula:

$$(OCN-(CH_2)_n)_m-Si(OR)_{4-m}$$

wherein R is an alkyl group having 1 to 8 carbon atoms, n is an integer of 1 to 8; m is an integer of 1 to 3, and particularly compounds having an NCO group at one end thereof in which m is 1 in view of good solvent solubility, recoating adhesiveness and availability.

Particular examples include $OCN-C_3H_6-Si(OCH_3)_3$, $OCN-C_3H_6-Si(OC_2H_5)_3$, $OCN-C_2H_4-Si(OCH_3)_3$, $OCN-C_4H_8-Si(OCH_3)_3$, $OCN-C_2H_4-Si(OC_2H_5)_3$, $OCN-C_4H_8-Si(OC_2H_5)_3$, $(OCN-C_3H_6-Si)_2(OCH_3)_2$, $(OCN-C_3H_6-Si)_3(OCH_3)$, $(OCN-C_3H_6-Si)_2(OC_2H_6)_2$ and $(OCN-C_3H_6-Si)_3(OC_2H_6)$. Among them, $OCN-C_3H_6-Si(OCH_3)_3$ and $OCN-C_3H_6-Si(OC_2H_5)_3$ are preferable in view of availability, solvent solubility and price.

Silane coupling agents having an amino group at its end are compounds of the representative formula $$(RO)_{4-m}Si-(Z)_m$$

wherein R is an alkyl group having 1 to 8 carbon atoms, m is an integer of 1 to 3; Z is an amino-containing organic group, and examples thereof include compounds having, at one end thereof, an amino-containing organic group such as, ketimine end type represented by $-A-N=C(R)_2$ wherein A is an alkylene group having 1 to 8 carbon atoms, and R may be the same or different and is an alkyl group having 1 to 8 carbon atoms;

$-A-NH_2$ wherein A is an alkylene group having 1 to 8 carbon atoms;

$-A-NH-X$ wherein A is an alkylene group having 1 to 8 carbon atoms and X may be a phenyl group or a partially substituted phenyl group; or $-A-NH-B-NH_2$ wherein A and B may be the same or different and are an alkylene group having 1 to 8 carbon atoms. Among them, the above compounds having ketimine at an end thereof ($-N=C(R)_2$) are preferable in view of good pot life and adhesiveness on a base coat when coating, and examples thereof include $(CH_3O)_3Si-C_3H_6-N=C(CH_3)(C_4H_8)$, $(C_2H_5O)_3Si-C_3H_6-N=C(CH_3)(C_4H_8)$ and the like.

A silane coupling agent having an epoxy group at its end is a compound represented by the formula: $(RO)_{4-m}Si-(Y)_m$, wherein R is an alkyl group having 1 to 8 carbon atoms, m is an integer of 1 to 3 and Y is an epoxy-containing organic group, and examples thereof include compounds having an epoxy group at one end thereof such as 3-glycidoxypropyltrimethoxysilane, 3-glycidoxypropylmethyldiethoxysilane, 3-glycidoxypropyltriethoxysilane, and 2-(3,4-epoxycyclohexyl)ethyltrimethoxysilane. Among them, 3-glycidoxypropyltrimethoxysilane is preferable in view of good adhesiveness on a base coat when coating and availability.

Examples of silane coupling agents having an acryloxy group at an end thereof include, for example, compounds having an acryloxy group at one end such as 3-acryloxypropyltrimethoxysilane and 3-acryloxypropyltriethoxysilane. 3-acryloxypropyltrimethoxysilane is preferable in view of good adhesiveness on a base coat when coating and availability.

Examples of silane coupling agents having a methacryloxy group at an end thereof include compounds having a methacryloxy group at one end such as 3-methacryloxypropyltrimethoxysilane, 3-methacryloxypropyltriethoxysilane, 3-methacryloxypropylmethyldimethoxysilane and 3-methacryloxypropylmethyldiethoxysilane. Among them, 3-methacryloxypropyltrimethoxysilane is preferable in view of good adhesiveness on a base coat when coating and availability.

The silane coupling agent having an amino group at one end can be used within a range of inhibiting influence on the isocyanate curing agent and the hydrophilizing agent when preparing and storing the composition, for example, by reducing the adding amount of the silane coupling agent or by adding the silane coupling agent immediately before coating without compounding to the curing agent composition (three-component type).

One or more silane coupling agents mentioned above can be used. Among them, silane coupling agents having an NCO group at one end thereof are preferable in that solvent solubility, storage stability of the curing agent composition, reactivity with the hydroxyl-containing resin, adhesiveness on a base coat when coating and recoating adhesiveness are particularly superior.

An adding amount of recoatability modifier (D1) is preferably from 0.1 to 25 parts by mass based on 100 parts by mass of the hydroxyl-containing resin (A) in view of good recoating adhesiveness. Particularly, the amount is preferably from 0.5 to 15 parts by mass, further from 1 to 8 parts by mass for achieving excellent effects in view of the balance between the coating film performances such as recoating adhesiveness, weather resistance, hardness of a coating film and strength of a coating film, and also in view of storage stability of the composition when compounding this additive to the base coating material. The amount of (D1) exceeding 25 parts by mass easily causes an adverse effect on storage stability of the base coating material, pot life when coating, a film forming property, weather resistance and material costs. When the amount is less than 0.1 part by mass, it is difficult to obtain sufficient recoating adhesiveness.

An adding amount of recoatability modifier (D2) is preferably from 0.1 to 25 parts by mass based on 100 parts by mass of the hydroxyl-containing resin (A) in view of good film forming property and recoating adhesiveness. Particularly, the amount is preferably from 0.5 to 15 parts by mass, further from 2 to 10 parts by mass for achieving excellent effects in view of the balance between the coating film performances such as recoating adhesiveness, weather resistance, hardness of a coating film and strength of a coating film, and the material costs and also in view of the storage stability of the composition when compounding this additive to a solution of the curing agent composition. The amount of (D2) exceeding 25 parts by mass easily causes an adverse effect on storage stability of the solution of the curing agent composition, pot life when coating, the film forming property, hardness of a coating film and material costs. When the amount is less than 0.1 part by mass, it is difficult to obtain sufficient recoating adhesiveness.

(E) Organic Solvent

The organic solvent (E) can be selected depending on kinds of other components, and examples thereof include aliphatic hydrocarbon based solvents such as hexane, heptane, octane, MINERAL SPIRIT, coal tar naphtha, SOLVESSO 100 and SOLVESSO 200; aromatic hydrocarbon based solvents such as xylene, toluene, benzene and trimethylbenzene; alcohol based solvents such as propanol, butanol and pentanol; glycol ether based solvents such as ethyl cellosolve, butyl cellosolve and diethylene glycol monoethyl ether; ketone based solvents such as acetone, methyl ethyl ketone, methyl isobutyl ketone, cyclohexanone and isophorone; ester based solvents such as ethyl acetate, propyl acetate, butyl acetate, cellosolve acetate, isobutyl acetate, diethylene glycol ethyl ether acetate, diethylene glycol methyl ether acetate, and propylene glycol methyl ether acetate.

In the organic solvent (E), it is preferable that a solid content is from 10 to 95% by weight, preferably from 20 to 70% by weight in view of good coating workability and surface concentration property of the hydrophilizing agent.

Among them, ester based solvents (e.g. butyl acetate, isobutyl acetate, ethylene glycol methyl ether acetate and propylene glycol methyl ether acetate) and ketone based solvents (e.g. methyl isobutyl ketone, methyl ethyl ketone and cyclohexanone) are preferable from the viewpoint of good compatibility and miscibility of the hydroxyl-containing resin (A), the recoatability modifier (D1), the recoatability modifier (D2), the isocyanate based curing agent (B), the organosilicate based hydrophilizing agents (C) and other optional additives and in view of good appearance of a coating film and good storage stability.

(F) Other Coating Components

In the coating composition of the present invention, various additives commonly used in coating compositions may be compounded within an amount not to impair actions and effects of the present invention. Examples of additives include a curing catalyst, an ultraviolet absorber, a leveling agent, a pigment, a dye, a filler, a photo-stabilizer, an antisagging agent, a defoaming agent, an antioxidant, a pigment wetting and dispersing agent and a lubricant.

A proper curing catalyst selected from well-known organometallic curing catalysts and inorganic curing catalysts may be used.

Examples of preferable curing catalysts include aluminum chelate compounds (e.g. diisopropoxyethyl acetoacetate aluminum, tris(ethyl acetoacetate)aluminum, isopropoxy bis(ethyl acetoacetate) aluminum and monoacetylacetonato bis(ethyl acetoacetate) aluminum); titanium chelate compounds (e.g. diisopropoxy bis(ethylacetoacetate) titanium and diisopropoxy bis(acetylacetonato)titanium); zirconium chelate compounds (e.g. zirconium tetraacetylacetonate, zirconium trimethoxyacetylacetonate, zirconium triethoxyacetylacetonate, zirconium dimethoxydiacetylacetonate and zirconium diethoxydiacetylacetonate); organotin compounds (e.g. dibutyltin dilaurate, dioctyltin dilaurate, dioctyltin maleate and dibutyltin maleate); organic protonic acids (e.g. p-toluenesulfonic acid and benzenesulfonic acid) since these are easily obtainable, easily soluble in a solvent and easily mixed with the coating composition and acceleration of curing of the hydroxyl-containing resin (A) and the isocyanate based curing agent is good.

In addition, inorganic curing catalysts, for example, $AlCl_3$, $Al(C_2H_5)_2Cl$, $TiCl_4$, $ZrCl_4$, $SnCl_4$, $FeCl_4$, $BF_3$, $BF_3$: lewis acids such as $(OC_2H_5)_2$; organic protonic acids such as metasulfonic acid, benzenesulfonic acid and p-toluenesulfonic acid; inorganic protonic acids such as phosphoric acid, phosphorous acid, phosphinic acid and sulfuric acid or esters thereof; and compounds having Si—O—Al bond such as aluminum silicate can be also used.

A mixing ratio of the curing catalyst is from 0.001 to 30 parts by mass, preferably from 0.01 to 10 parts by mass based on 100 parts by mass of the hydroxyl-containing resin (A).

In the case of compounding an appropriate defoaming agent, the defoaming property is improved without significantly impairing the surface hydrophilization. Examples of appropriate defoaming agents include, for example, siloxane based defoaming agents such as long chain fluoroalkyl-modified siloxane, fluorosilicone based defoaming agents such as FA-600 and FS-1265 (both are available from SHIN-ETSU CHEMICAL CO., LTD.), silicon compound based defoaming agents, silicone based defoaming agents and acrylic defoaming agents.

Preparation of the coating composition of the present invention is preferably carried out by mixing the first resin composition including the hydroxyl-containing resin (A), the recoatability modifier (D1) and the organic solvent (E) with the second curing agent composition including the isocyanate based curing agent (B), the organosilicate based hydrophilizing agent (C), the recoatability modifier (D2) and the organic solvent (E), in view of improvement of the coating workability and easy storage of the respective compositions after preparing them industrially.

Each component of the first resin composition and the second curing agent composition may be mixed in a ratio providing the above-mentioned ratio of each component in the low-staining room temperature curable coating composition of the present invention. However, in both compositions, in the case where unexpected deterioration of the recoatability modifier (D2) and the organosilicate based hydrophilizing agent (C) may be caused by long term storage or depending on the coating conditions when coating (a coating method and environment for coating), for example, the recoatability modifier agent (D1), the recoatability modifier (D2) and the organosilicate based hydrophilizing agent (C) may be used by mixing them to the first resin composition and the second curing agent composition immediately before coating without compounding them during preparation of the compositions.

In the case where a filler, a matting agent, a thickener, a defoaming agent, a leveling agent and a curing catalyst are compounded, they are desirably compounded in the first resin composition from the viewpoint of storage stability.

A method for forming a coating film may be a known method. Coating films can be formed by applying the composition on a substrate and then drying by air at an ambient temperature or drying with heat, in which the composition is applied by a coating method such as roller coating, brush coating and spray coating for on-site application, and by a coating method such as dip coating, gravure coating, coil coating and curtain flow coating for the use and purpose other than on-site application. Though the curing temperature and time depend on kind of a curing agent, a coating amount and kind of a solvent to be used, desirably, in the case where the film is formed by curing at room temperature, the film may be left at ambient temperature for about one hour to about 10 days, and in the case where the film is formed by forced drying, the film is usually cured by heating at about 50 to about 200° C. for 1 to 180 minutes.

The composition has good coating workability (pot life) and recoatability (adhesiveness of lap coating), and also surface hydrophilizing performance and low-staining property of the obtained coating film are good. Thus outdoor coating workability, especially for lap coating and low-staining property can be easily secured.

Examples of substrates to be coated include inorganic substrates such as glass, slate and concrete; metallic substrates such as aluminum, steel, zinc, tin, copper and stainless steel, steel substrates plated with zinc, tin, chromium, etc. on the surfaces thereof and metals of steel etc. having surfaces treated with chromic acid, phosphoric acid or the like; plastic substrates such as polyethylene, polyvinyl chloride, polypropylene and ABS resin; a tape prepared by providing an adhesive layer or a thickener layer on a substrate film such as polyvinyl chloride, polyethylene terephthalate or aluminum; and further substrates obtained by applying a well-known primer, an intermediate coating material and a top coating material on the substrates mentioned above.

The coating composition of the present invention can be used as coating materials for exterior walls and roofs of constructions (buildings, chemical plants (facilities for manufacturing and stocking chemicals, resins, petroleum and other chemical products), shops, animal housings, facilities for producing and storing foods and beverages and membrane structures) and as coating materials for indoor structural materials such as ceramic materials and interior materials, automobiles, aircrafts, marine vessels, trains or the like.

EXAMPLE

The present invention is explained with the examples and comparative examples, but is not limited to them.

Example 1

Preparation of White Paint

To a sand grinder, 32.9 parts by mass of hydroxyl-containing fluororesin varnish (ZEFFLE GK-570. Butyl acetate solution of tetrafluoroethylene based resin available from DAIKIN INDUSTRIES, LTD. Solid contents: about 65% by mass. Resin having a hydroxyl value of about 63 mgKOH/g, hereinafter referred to as A-1), 42.9 parts by mass of general rutile type titanium oxide and 6.4 parts by mass of butyl acetate were charged and then glass beads were added thereto. Subsequently, the mixture was stirred and dispersed at 1,000 rpm for one hour and then the glass beads were filtered off. To 82.2 parts by mass of the obtained titanium oxide paste, 17.8 parts by mass of the above hydroxyl-containing fluororesin varnish (GK-570) was added and then mixed sufficiently to prepare white paint as a base material.

Preparation of the First Resin Composition

To 100 parts by mass of the white paint prepared above, 1.3 parts by mass of thickener (BYK410. Urea resin based thickener available from Byk Chemie) was added and then the mixture was stirred and mixed at 2,500 rpm for 30 minutes with TK HOMO DISPER (available from Primix Corporation). To the mixture, 3 parts by mass of an amide-containing polymer (BYK4500 available from Byk Chemie, hereinafter referred to as D1-1) as a recoatability modifier (D1) and 1 part by mass of a defoaming agent (BYK066N: Silicon based defoaming agent available from Byk Chemie) were added and furthermore, the mixture was stirred and mixed under the same conditions as above with TK HOMO DISPER to prepare the first resin composition.

Second Curing Agent Composition

The second curing agent composition was prepared by homogenously mixing 6.8 parts by mass of a hexamethylene diisocyanate based curing agent (DURANATE TPA-100 available from ASAHI KASEI CHEMICALS CORPORATION, hereinafter referred to as B-1), 1 part by mass of an organosilicate based hydrophilizing agent (ZEFFLE GH-701: Fluoroorganosilicate available from DAIKIN INDUSTRIES, LTD., hereinafter referred to as C-1), 1.7 parts by mass of OCN—$C_3H_6$—$Si(OCH_3)_3$ (available from MOMENTIVE PERFORMANCE MATERIALS INC., hereinafter referred to as D2-1) being a silane coupling agent having an NCO group at one end as a recoatability modifier (D2) and 11.6 parts by mass of butyl acetate.

To 100 parts by mass of the prepared first resin composition, 20 parts by mass of the second curing agent composition was added and to the mixture, 5 parts by mass of a mixed solution prepared by mixing butyl acetate and propylene glycol methyl ether acetate in a mass ratio of 50/50 was added as a diluent, thereby adjusting the solid content to about 66% by mass to prepare the coating composition of the present invention.

Recoatability, surface hydrophilization, pot life, staining and weather resistance of the obtained coating composition were examined according to the following methods. The results are shown in Table 1.

(1) Recoatability (Lap Coating or Overcoating)

Commercially available two component urethane based coating material for construction-related application (ZEFFLE™ heat shield intermediate coating available from DAIKIN INDUSTRIES, LTD.) is preliminarily applied on an aluminum plate subjected to chemical conversion treatment (AM713 treatment in accordance with JIS H4000 A1050P) by spray coating and then cured at room temperature for 1 day to prepare a base coated plate with a primer layer having a thickness of about 40 μm after the drying. On the coated plate, the coating composition of the present invention is coated by brush so as to have a thickness of about 30 μm after the drying, and then the coated plate is cured in a thermo-hydrostat (23° C., relative humidity: 55%) for five days to form a first top coat layer.

On the first top coat layer of the coated plate after curing, the same coating composition of the present invention as above is coated by brush so as to have a thickness of about 30 μm after the drying, and then the coated plate is cured in a thermo-hydrostat (23° C., relative humidity: 55%) for five days to form a second top coat layer.

After wiping the overcoated surface of the obtained coated plate with an ethanol-impregnated cloth, the surface is cross-cut into 16 squares (about 2 mm on a side) by a cutter-knife. Subsequently, a transparent adhesive tape (Sellotape™ CT-18 available from NICHIBAN CO., LTD.) is pushed and contacted closely with the cross-cut area and then the tape is abruptly peeled by hand. The adhesiveness between the first top coat layer and the second top coat layer is visually evaluated. Criteria for the evaluation are as follows.
A: No peeling occurs.
B: Slight peeling is recognized partially.
C: Peeling occurs widely
D: Peeling easily occurs on the whole area. .

(2) Surface Hydrophilization

Two coated plates on which the first top coat layer is formed in the same manner as in the test of recoatability of the above (1) are prepared (the coated plates are cured for 2 days) and are subjected to an outdoor exposure test and a water sink test.

Outdoor Exposure Test

The coated test plate is set on the roof of a building in Osaka Prefecture with being inclined at 30° toward southern direction. After the seven-day exposure, a static water contact angle of the exposed plate is measured by a contact angle meter (a contact angle meter CA-DT type A available from KYOWA INTERFACE SCIENCE CO. LTD.).

Water Sink Test

The test plate is immersed in ion exchange water for one day and is left at room temperature (18 to 23° C.) for 2 hours and then a static water contact angle of the plate is measured similarly to the outdoor exposure test.

In both tests, the smaller the water contact angle is, the better the hydrophilization is.

(3) Pot Life

A first resin composition and a second curing agent composition are mixed and a diluent is added to the mixture to prepare a coating composition.

The coating composition immediately after preparing is directly coated on the aluminum plate subjected to chemical conversion treatment used in the evaluation of recoatability of the above (1) (6 mil film applicator is used). Subsequently, the coated plate is cured in a thermo-hygrostat (23° C., relative humidity: 55%) at room temperature for 2 days, and then the plate is immersed in ion exchange water for one day and is left at room temperature for 2 hours. A water contact angle of the plate is then measured (the measuring device is the same as one used in the hydrophilization test).

The coating composition having been left in place for four hours after preparing is applied on an aluminum plate subjected to chemical conversion treatment and cured in the same manner as above. The coated plate is immersed in ion exchange water for one day and left in place at room temperature (18 to 23° C.) for 2 hours and a water contact angle of the plate is measured.

In the case where increase in a water contact angle is larger as time elapses after preparation of a coating composition, it indicates that hydrolysis progresses during storage of the coating composition and therefore the pot life is shorter.

(4) Staining

The coated plate having the first top coat layer formed in the recoatability test as described in the above (1) is subjected to an outdoor exposure test (three months) in the hydrophilization test.

Color differences before and after the exposure of each coated plate are measured with a colorimeter (SZ-Σ90 available from NIPPON DENSHOKU INDUSTRIES CO., LTD.).

Staining levels of the coated plate are visually evaluated.
Criteria of the evaluation are as follows.
A: A very few staining
B: Partially staining
C: Widely staining
D: Entirely staining

(5) Weather Resistance

The coated plate having the first top coat layer formed in the recoatability test as described in the above (1) is subjected to an accelerated weathering test.

Test Procedure

The coated plate is tested using an EYE Super UV tester W-13 (available from IWASAKI ELECTRIC CO., LTD.) as a weathering tester. The test is conducted under the test conditions of 26 cycles for 598 hours in total provided that one cycle comprises 23 hours, comprising 11 hours of irradiation (temperature of black panel: 63° C., relative humidity: 70%, mean illuminance: 100 mW/cm$^2$)/11 hours of dew condensation (room temperature, relative humidity: 100%)/1 hour of rest (temperature of black panel: 63° C., relative humidity: 85%). Specular gloss of 60 degree before and after the test is measured using a glossmeter and a retention ratio of brightness after the test is determined. Color levels (value, chroma, hue) before and after the test are measured using a colorimeter and a color difference ΔE* after the test is determined.

Examples 2 to 4

The coated plates were prepared in the same manner as in Example 1 except that the coating compositions prepared by compounding each component in adding amounts of Table 1 were used, and the recoatability, surface hydrophilization, pot life, staining and weather resistance thereof were examined. The results are shown in Table 1.

Comparative Examples 1 to 5

The coated plates were prepared in the same manner as in Example 1 except that the comparative coating compositions prepared by compounding each component in adding amounts of Table 1 were used, and the recoatability, surface hydrophilization, pot life, staining and weather resistance thereof were examined. The results are shown in Table 1.

Each component represented in Table 1 is as follows.

Hydroxyl-containing resin (A-1): Hydroxyl-containing fluororesin varnish (ZEFFLE GK-570. Butyl acetate solution of tetrafluoroethylene based resin available from DAIKIN INDUSTRIES, LTD. Solid content: about 65% by mass. Resin having a hydroxyl value of about 63 mgKOH/g).

Isocyanate based curing agent (B-1): Hexamethylene diisocyanate based curing agent (DURANATE TPA-100 available from ASHAHI KASEI CHEMICALS CORPORATION).

Organosilicate based hydrophilizing agent (C-1): Tetrafunctional fluoroorganosilicate (ZEFFLE GH-701 available from DAIKIN INDUSTRIES, LTD.).

Recoatability modifier (D1-1): Amide-containing polymer (BYK4500 (solution having a concentration of 40% by mass) available from Byk Chemie).

Recoatability modifier (D2-1): OCN—C$_3$H$_6$—Si(OCH$_3$)$_3$ being a silane coupling agent containing an NCO group at one end (available from MOMENTIVE PERFORMANCE MATERIALS INC.).

Recoatability modifier (D2-2): Silane coupling agent having ketimine at one end (KBE9103 available from SHIN-ETSU CHEMICAL CO., LTD.).

Filler: General rutile type titanium oxide

Thickener: Urea resin based thickener (BYK410 available from Byk Chemie).

Defoaming agent: Silicone based defoaming agent (BYK066N available from Byk Chemie).

Curing catalyst: Organozirconium based curing catalyst (K-KAT XC-4205 available from KUSUMOTO CHEMICALS, LTD.).

TABLE 1

| | Ex. 1 | Ex. 2 | Ex. 3 | Ex. 4 |
|---|---|---|---|---|
| Coating composition (part by mass) | | | | |
| First resin composition | | | | |
| White paint | | | | |
| (A) Hydroxyl-containing resin | | | | |
| A-1 | 50.7 | 50.7 | 50.7 | 50.7 |
| Filler | 42.9 | 42.9 | 42.9 | 42.9 |
| Butyl acetate | 6.4 | 6.4 | 6.4 | 6.4 |
| (D-1) Recoatability modifier | | | | |
| D1-1 | 3 | 3 | 3 | 3 |
| Thickener | 1.3 | 1.3 | 1.3 | 1.3 |
| Defoaming agent | 1 | 1 | 1 | 1 |
| Curing catalyst | — | — | — | — |
| Second curable agent composition | | | | |
| (B) Isocyanate based curing agent | | | | |
| B-1 | 6.8 | 6.8 | 6.8 | 6.8 |
| (C) Organosilicate based hydrophilizing agent | | | | |
| C-1 | 1 | 1 | 1 | 1 |
| (D2) Recoatability modifier | | | | |
| D2-1 | 1.7 | 1 | — | — |
| D2-2 | — | — | 1.7 | 1 |
| Butyl acetate | 11.6 | 11.6 | 11.6 | 11.6 |
| Physical properties of coating film | | | | |
| Recoatability | A | A | A | A |
| Surface hydrophilization (Water contact angle: degree) | | | | |
| After outdoor exposure test | 38 | 36 | 38 | 23 |
| After water sink test | 28 | 27 | 30 | 30 |
| Pot life (Water contact angle: degree) | | | | |
| Immediately after preparing | 28 | 27 | 30 | 30 |
| After leaving for 4 hours | 35 | 37 | 43 | 45 |
| Staining | | | | |
| Appearance | A | A | A | A |
| Color difference (ΔE) | 1.6 | 1.6 | 1.9 | 0.9 |
| Weather resistance in accelerated weathering | | | | |
| Gloss retention (%) | 97 | 98 | 97 | 97 |
| Color difference (ΔE) | 1.2 | 1.3 | 1.3 | 1.2 |

| | Com. Ex. 1 | Com. Ex. 2 | Com. Ex. 3 | Com. Ex. 4 | Com. Ex. 5 |
|---|---|---|---|---|---|
| Coating composition (part by mass) | | | | | |
| First resin composition | | | | | |
| White paint | | | | | |
| (A) Hydroxyl-containing resin | | | | | |
| A-1 | 50.7 | 50.7 | 50.7 | 50.7 | 50.7 |
| Filler | 42.9 | 42.9 | 42.9 | 42.9 | 42.9 |
| Butyl acetate | 6.4 | 6.4 | 6.4 | 6.4 | 6.4 |
| (D-1) Recoatability modifier | | | | | |
| D1-1 | — | — | — | 3 | — |
| Thickener | 1.3 | 1.3 | 1.3 | 1.3 | 1.3 |

TABLE 1-continued

|  | | | | | |
|---|---|---|---|---|---|
| Defoaming agent | 1 | 1 | 1 | 1 | 1 |
| Curing catalyst | — | — | 38.7 | — | — |
| Second curable agent composition | | | | | |
| (B) Isocyanate based curing agent | | | | | |
| B-1 | 6.8 | 6.8 | 6.8 | 6.8 | 6.8 |
| (C) Organosilicate based hydrophilizing agent | | | | | |
| C-1 | 1 | 1 | 1 | 1 | — |
| (D2) Recoatability modifier | | | | | |
| D2-1 | — | 1.7 | 1.7 | — | — |
| D2-2 | — | — | — | — | — |
| Butyl acetate | 12.7 | 11 | 11 | 13.3 | 12.7 |
| Physical properties of coating film | | | | | |
| Recoatability | D | D | B | C-D | A |
| Surface hydrophilization | | | | | |
| (Water contact angle: degree) | | | | | |
| After outdoor exposure test | 40 | 35 | 50 | 32 | 90 |
| After water sink test | 21 | 25 | 50 | 29 | — |
| Pot life (Water contact angle: degree) | | | | | |
| Immediately after preparing | 21 | 25 | 50 | 29 | — |
| After leaving for 4 hours | 30 | 42 | 93 | 35 | — |
| Staining | | | | | |
| Appearance | A | A | B | A | D |
| Color difference (ΔE) | 2.2 | 2.7 | 3.6 | 2.6 | 9 |
| Weather resistance in accelerated weathering | | | | | |
| Gloss retention (%) | 98 | 98 | 97 | 97 | 99 |
| Color difference (ΔE) | 1.2 | 1.2 | 1.2 | 1.3 | 1.1 |

From the results shown in Table 1, it is seen that in Comparative Examples 1 to 5, any of lap coating property, pot life, hydrophilizing performance and low-staining performance is insufficient and therefore, the performance balance is inferior, and that in Examples 1 to 4 of the present invention, all of them are good and the performance balance of the coating composition is superior.

Example 5

Preparation of White Paint

To a sand grinder, 35 parts by mass of hydroxyl-containing fluororesin varnish (LUMIFLON LF200, xylene solution of chlorotrifluoroethylene based resin available from ASAHI GLASS CO., LTD. Solid content: about 60% by mass. Resin having a hydroxyl value of about 52 mgKOH/g, hereinafter referred to as A-2), 42.9 parts by mass of general rutile type titanium oxide and 2.17 parts by mass of butyl acetate were charged and then glass beads were added thereto. Subsequently, the mixture was stirred and dispersed at 1,000 rpm for one hour and then the glass beads were filtered off. To 80.07 parts by mass of the obtained titanium oxide paste, 19.93 parts by mass of the above hydroxyl-containing fluororesin varnish (LF-200) was added and then mixed sufficiently to prepare a white paint as a base material.

Preparation of First Resin Composition

To 100 parts by mass of the white paint prepared above, 1.3 parts by mass of a thickener (BYK410, a urea resin based thickener available from Byk Chemie) was added, and the mixture was stirred and mixed at 2,500 rpm for 30 minutes with TK HOMO DISPER (available from PRIMIX CORPORATION). Subsequently, 3 parts by mass of an amide-containing polymer (BYK4500 available from Byk Chemie, hereinafter referred to as D1-1) as the recoatability modifier (D1) and 1 part by mass of a defoaming agent (BYK066N, a silicon based defoaming agent available from Byk Chemie) were added and the mixture was stirred and mixed under the same condition as above with TK HOMO DISPER to prepare the first resin composition.

Preparation of Second Curing Agent Composition

The second curing agent composition was prepared by homogenously mixing 5.6 parts by mass of a hexamethylene diisocyanate based curing agent (DURANATE TPA-100 available from ASAHI KASEI CHEMICALS CORPORATION, hereinafter referred to as B-1), 1 part by mass of an organosilicate based hydrophilizing agent (ZEFFLE GH-701, tetrafunctional fluoroorganosilicate available from DAIKIN INDUSTRIES, LTD, hereinafter referred to as C-1), 1.7 parts by mass of OCN—$C_3H_6$—Si(OCH$_3$)$_3$ being a silane coupling agent containing an NCO group at one end (available from MOMENTIVE PERFORMANCE MATERIALS INC., hereinafter referred to as D2-1) as the recoatability modifier (D2), and 12.8 parts by mass of butyl acetate to prepare the second curing agent composition.

To 100 parts by mass of the prepared first resin composition, 20 parts by mass of the second curing agent composition was added. To the mixture, 5 parts by mass of a mixed solution prepared by mixing butyl acetate and propylene glycol methyl ether acetate in a mass ratio of 50/50 was added as a diluent to dilute the mixture, and thereby the coating composition of Example 5 was prepared.

Recoatability, surface hydrophilization, pot life, staining and weather resistance of the obtained coating composition were examined. The results are shown in Table 2.

Example 6

The coating composition of Example 6 was prepared in the same manner as in Example 5 except that 1 part by mass of OCN—$C_3H_6$—Si(OCH$_3$)$_3$ being a silane coupling agent (available from MOMENTIVE PERFORMANCE MATERIALS INC., hereinafter referred to as D2-1) as a recoatability modifier and 13.5 parts by mass of butyl acetate in the second curing agent composition were used.

Recoatability, surface hydrophilization, pot life, staining and weather resistance of the obtained coating composition were examined. The results are shown in Table 2.

Example 7

Preparation of White Paint

To a sand grinder, 36.9 parts by mass of an acrylic polyol resin varnish (ACRYDIC A-801-P, a toluene/butyl acetate solution of acrylic polyol resin available from DIC Corporation. Solid content: about 50% by mass. Resin having a hydroxyl value of about 100 mgKOH/g, hereinafter referred to as A-3), 36.97 parts by mass of a general rutile type titanium oxide, and 6.18 parts by mass of butyl acetate were charged and then glass beads were added thereto. Subsequently, the mixture was stirred and dispersed at 1,000 rpm for one hour and then the glass beads were filtered off. To 80 parts by mass of the obtained titanium oxide paste, 19.95 parts by mass of the above acrylic polyol resin varnish (A-801-P) was added and then mixed sufficiently to prepare a white paint as a base material.

Preparation of First Resin Composition

To 100 parts by mass of the white paint prepared above, 1.2 parts by mass of a thickener (BYK410, a urea resin based thickener available from Byk Chemie) was added, and the mixture was stirred and mixed at 2,500 rpm for 30 minutes with TK HOMO DISPER (available from PRIMIX CORPORATION). Subsequently, 3 parts by mass of an amide-containing polymer (BYK4500 available from Byk Chemie, hereinafter referred to as D1-1) as the recoatability modifier (D1) and 1 part by mass of a defoaming agent (BYK066N, a silicon based defoaming agent available from Byk Chemie) were added and the mixture was stirred and mixed under the same condition as above with TK. HOMO DISPER to prepare the first resin composition.

Preparation of Second Curing Agent Composition

The second curing agent composition was prepared by homogenously mixing 9.21 parts by mass of a hexamethylene diisocyanate based curing agent (DURANATE TPA-100 available from ASAHI KASEI CHEMICALS CORPORATION, hereinafter referred to as B-1), 0.85 part by mass of an organosilicate based hydrophilizing agent (ZEFFLE GH-701, tetrafunctional fluoroorganosilicate available from DAIKIN INDUSTRIES, LTD., hereinafter referred to as C-1), 1.42 parts by mass of OCN—$C_3H_6$—Si(OCH$_3$)$_3$ (available from MOMENTIVE PERFORMANCE MATERIALS INC.) as the recoatability modifier (D2-1) and 9.6 parts by mass of butyl acetate.

To 100 parts by mass of the prepared first resin composition, 20 parts by mass of the second curing agent composition was added. To the mixture, 5 parts by mass of a mixed solution prepared by mixing butyl acetate and propylene glycol methyl ether acetate in a mass ratio of 50/50 was added as a diluent to dilute the mixture. Thus, the coating composition of Example 7 was prepared.

Recoatability, surface hydrophilization, pot life, staining and weather resistance of the obtained coating composition were examined. The results are shown in Table 2.

Example 8

The coating composition of Example 8 was prepared in the same manner as in Example 7 except that 0.85 part by mass of D2-1 as a recoatability modifier and 10.1 parts by mass of butyl acetate in the second curing agent composition were used.

Recoatability, surface hydrophilization, pot life, staining and weather resistance of the obtained coating composition were examined. The results are shown in Table 2.

TABLE 2

| | Ex. 5 | Ex. 6 | Ex. 7 | Ex. 8 |
|---|---|---|---|---|
| Coating composition (part by mass) | | | | |
| First resin composition | | | | |
| White paint | | | | |
| (B) Hydroxy-containing resin | | | | |
| A-2 | 54.93 | 54.93 | — | — |
| (C) Hydroxyl-containing resin | | | | |
| A-3 | — | — | 56.85 | 56.85 |
| Filler | 42.9 | 42.9 | 36.97 | 36.97 |
| Butyl acetate | 2.17 | 2.17 | 6.18 | 6.18 |
| (D-1) Recoatability modifier | | | | |
| D1-1 | 3 | 3 | 3 | 3 |
| Thickener | 1.3 | 1.3 | 1.2 | 1.2 |
| Defoaming agent | 1 | 1 | 1 | 1 |
| Curing catalyst | — | — | — | — |
| Second curable agent composition | | | | |
| (B) Isocyanate based curing agent | | | | |
| B-1 | 5.6 | 5.6 | 9.21 | 9.21 |
| (C) Organosilicate based hydrophilizing agent | | | | |
| C-1 | 1 | 1 | 0.85 | 0.85 |
| (D2) Recoatability modifier | | | | |
| D2-1 | 1.7 | 1 | 1.42 | 0.85 |
| Butyl acetate | 12.8 | 13.5 | 9.6 | 10.1 |
| Physical properties of coating film | | | | |
| Recoatability | A | A | A | A |
| Surface hydrophilization (Water contact angle: degree) | | | | |
| After outdoor exposure test | 40 | 39 | 36 | 30 |
| After water sink test | 31 | 30 | 33 | 32 |
| Pot life (Water contact angle: degree) | | | | |
| Immediately after preparing | 39 | 29 | 37 | 38 |
| After leaving for 4 hours | 42 | 39 | 44 | 46 |
| Staining | | | | |
| Appearance | A | A | A | A |
| Color difference (ΔE) | 1.7 | 1.75 | 1.9 | 1.9 |
| Weather resistance in accelerated weathering | | | | |
| Gloss retention (%) | 96 | 96 | 62 | 61 |
| Color difference (ΔE) | 1.3 | 1.4 | 1.8 | 1.9 |

The invention claimed is:

1. A room temperature curable coating composition comprising (A) a hydroxyl-containing resin, (B) an isocyanate based curing agent, (C) an organosilicate based hydrophilizing agent, (D) a recoatability modifier and (E) an organic solvent, wherein the recoatability modifier (D) comprises at least (D1) an amide-containing polymer and (D2) a silane coupling agent.

2. The coating composition according to claim 1, wherein the hydroxyl-containing resin (A) is a hydroxyl-containing fluororesin (A1).

3. A method for preparing the coating composition according to claim 1, comprising mixing a first resin composition comprising the hydroxyl-containing resin (A), the recoatability modifier (D1) and the organic solvent (E) and a second curing agent composition comprising the isocyanate based curing agent (B), the organosilicate based hydrophilizing agent (C), the recoatability modifier (D2) and the organic solvent (E).

4. A resin composition comprising the hydroxyl-containing resin (A), the recoatability modifier (D1) and the organic solvent (E), which is used in the method for preparing the coating composition according to claim 3.

5. A curing agent composition comprising the isocyanate based curing agent (B), the organosilicate based hydrophilizing agent (C), the recoatability modifier (D2) and the organic solvent (E), which is used in the method for preparing the coating composition according to claim 3.

6. A coated article produced by coating the room temperature curable coating composition according to claim 1.

7. A coated article produced by coating the room temperature curable coating composition according to claim 2.

* * * * *